May 5, 1970  O. WAAG ET AL  3,510,159
HOLLOW LEG JOINT CONSTRUCTION
Filed July 16, 1968  2 Sheets-Sheet 2
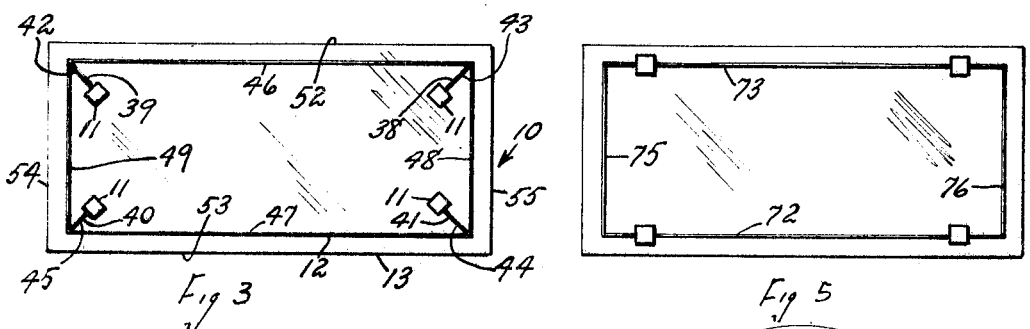
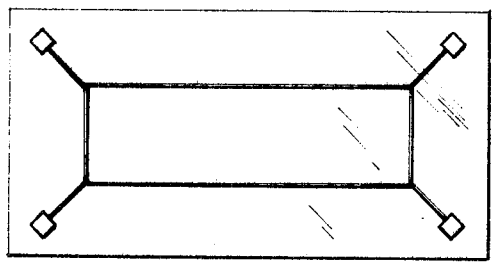
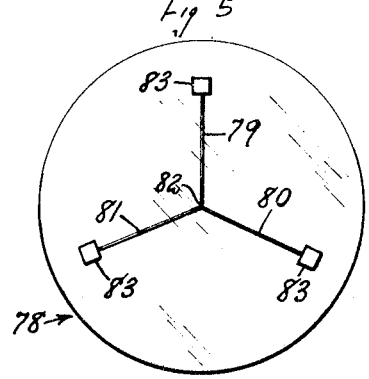
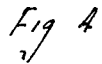
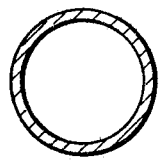
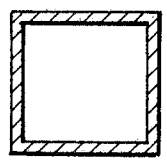
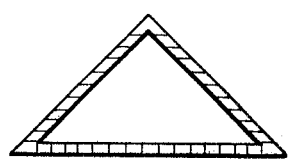
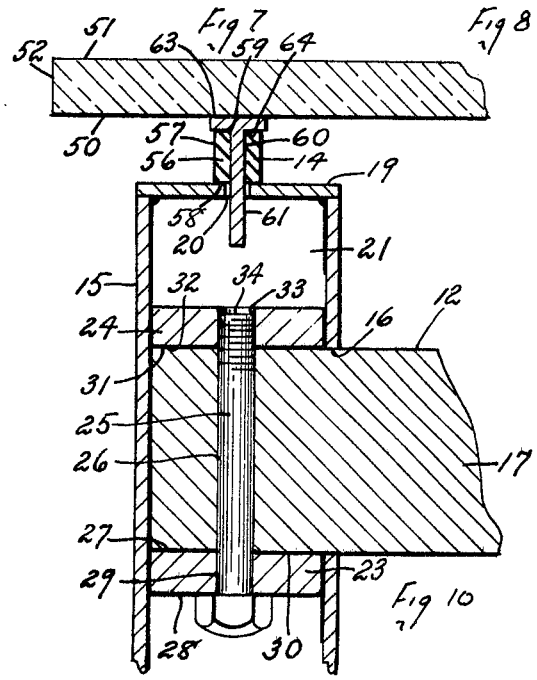
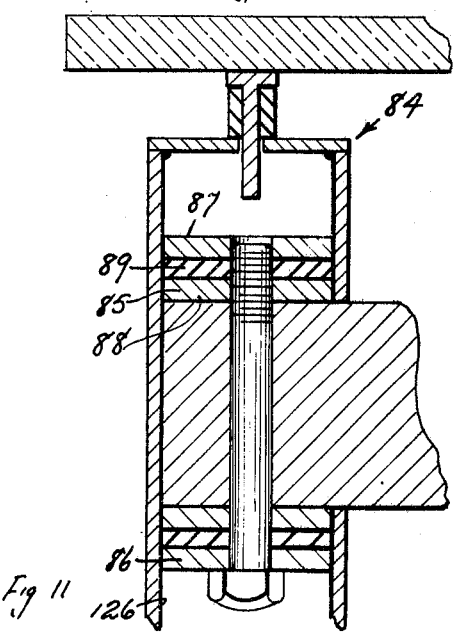

United States Patent Office 3,510,159
Patented May 5, 1970

---

3,510,159
HOLLOW LEG JOINT CONSTRUCTION
Otto Waag, 4 Poplar Place, Bay Shore, N.Y. 11706, and David Rosen, Forrest Hills, N.Y.; said Rosen assignor to said Waag
Filed July 16, 1968, Ser. No. 745,151
Int. Cl. E04g 7/00
U.S. Cl. 287—56                                    5 Claims

ABSTRACT OF THE DISCLOSURE

A hollow metallic leg joint construction for interconnecting a horizontally disposed frame member therewith, including a longitudinally disposed opening in the hollow leg penetrated by the frame member, a pair of clamping members disposed within the hollow bore formed by the leg member on either side of the opening, threaded means for tightening the clamping members upon the frame member to immobilize the same, at least one of said clamping members being maintained immobile with respect to the leg after the threaded means is tightened. In one embodiment, the clamping members are resiliently expandible upon tightening, to accommodate normal commercial manufacturing tolerances.

---

This invention relates generally to the field of metallic furniture construction of a type particularly adapted in the manufacture of tables and similar articles of furniture having glass or other table surfaces which rest upon a frame structure and are maintained solely by gravitational and frictional forces.

It is common in the furniture manufacturing art to form metallic frames of the class described by casting or welding, both of which are expensive manufacturing procedures, and prohibit the shipping of the furniture in disassembled condition, which is often desirable to save shipping costs and storage space. Cheaper constructions employing nut and bolt integrating means are also known in the art, but these devices are invariably unattractive in appearance, particularly where transparent table tops are employed which expose the nut and bolt means to view when the table is in use. Invariably, such constructions present an unattractive and unacceptable appearance to the user.

It is therefore among the principal objects of the present invention to provide an improved hollow leg joint construction, suitable for employment in the construction of contemporary furniture, in which the above mentioned disadvantages have been substantially eliminated.

Another object of the invention lies in the provision of an improved hollow leg joint construction which permits the furniture to be fabricated and shipped in unassembled condition, and in which upon assembly, all threaded interconnecting means are completely concealed from view.

Yet another object of the invention lies in the provision of an improved hollow leg joint construction, possessed of the above advantages, in which the cost of fabrication may be of a reasonably low order, thereby permitting consequent wide sale, distribution and use.

Yet another object of the invention lies in the provision of an improved hollow leg joint construction which can be conveniently assembled by those possessed of only ordinary skill and using only simple tools.

A further object of the invention lies in the provision of improved hollow leg joint construction which, upon assembly, presents an extremely rigid construction, directly comparable with cast or welded fabrication.

A feature of the disclosed embodiment lies in the provision of means for leveling the table top element thereof with respect to the leg elements, in the event that the device is placed upon an irregular surface.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIG. 3 is a top plan view of a second alternate form of the embodiment.

FIG. 4 is a top plan view of the form of the first embodiment shown in FIG. 1.

FIG. 5 is a top plan view of the form of the first embodiment shown in FIG. 2.

FIG. 6 is a top plan view of a third alternate form of the first embodiment.

FIG. 7 is a top plan view of one cross sectional shape of leg element which may be employed in conjunction with any of the forms shown in FIGS. 3 to 6, inclusive.

FIG. 8 is an enlarged top plan view of the leg element shown in FIG. 1.

FIG. 9 is a top plan view of another cross sectional shape of leg element which may be used with any of the forms shown in FIGS. 3 through 6, inclusive.

FIG. 10 is a schematic vertical longitudinal sectional view of the embodiment shown in FIG. 1.

FIG. 11 is a similar schematic sectional view showing a second embodiment of the invention.

Figure 1:
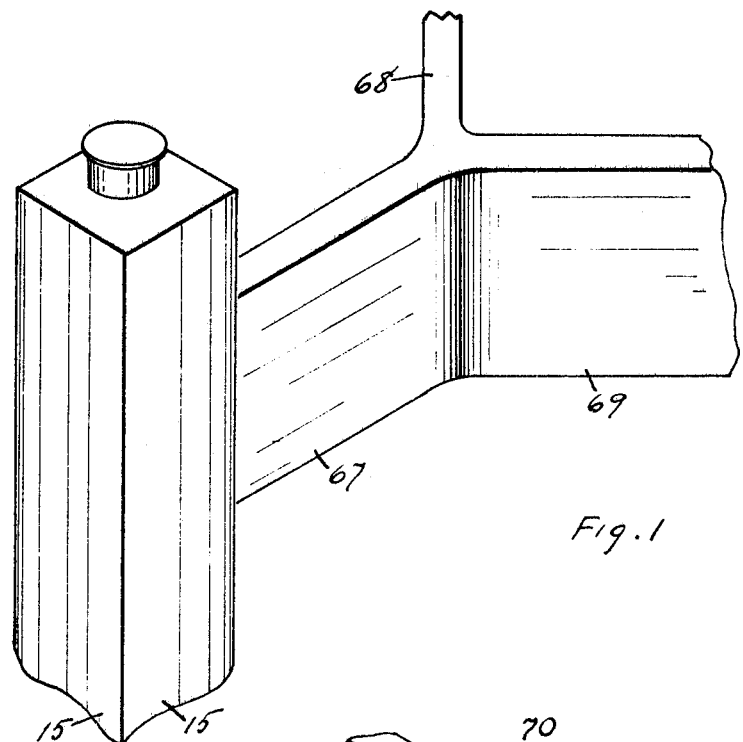
FIG. 1 is a fragmentary view in perspective of an embodiment of the invention.

In accordance with the first embodiment of the invention, as illustrated in FIG. 3, the device, generally indicated by reference character 10, comprises broadly: a plurality of vertical leg elements 11, a horizontal frame element 12, a table top element 13, and a plurality of leveling elements 14 (see FIG. 10).

The leg elements 11 are substantially similar, and may be formed by metal extrusion, casting, or by welding up planar strips of metal. Each includes a plurality of side walls 15, one of which defines an elongated slot 16 corresponding in configuration to the cross section of a portion 17 of the frame element 12 which projects therethrough.

Interconnected with the upper edges 18 of the walls 15 is a plate 19, the peripheral configuration of which conforms to the cross section of the leg element, the plate 19 defining a generally centrally disposed opening 20 communicating with the hollow bore 21 of the leg element. Positioned within the bore 21 adjacent the slot 16 is a leveling element 14.

Referring to FIG. 10, the leg element includes a first fixed member 23 which is force fitted with respect to the surface of the bore 21, and a relatively movable member 24. Bolt means 25 penetrates a bore 26 in the fame element 12.

The fixed member 23 is bounded by an upper surface 27 and a lower surface 28 and includes a centrally disposed axially aligned bore 29 through which the bolt means 25 passes. The upper surface 27 engages the lower surface 30 of the frame element.

The movable member 24 includes a lower surface 31 which engages the upper surface 32 of the frame element as well as the threaded bore 33 which engages the threaded shank 34 of the bolt means 25.

From a consideration of FIG. 10, it will be apparent that the frame element 12 is assembled within the leg element 11 by inserting the same through the slot 16, following which the blot means 25 is inserted from the bottom to engage the fixed member 23, the frame element 12, and threadedly engage the movable member 24. Tightening of the head of the bolt means will cause the frame element to be clamped between the fixed member 23 and the movable member 24, and as the fixed member 23 is force fitted with respect to the leg element 11, the frame element will be completely immobilized as a result of such tightening with respect to the leg element.

The horizontal frame element 12 may be of any desired configuration, as for example that seen in FIG. 3, wherein a plurality of horizontally arranged extensions 38, 39, 40 and 41 are welded or cast integrally to from joints 42, 43, 44 and 45. Side members 46 and 47 and end members 48 and 49 are disposed in coplanar relationship with respect to the extensions 38–41, inclusive, all of which lie below the plate 19 upon assembly.

The table top element 13 is preferably of transparent glass, so as to expose the frame element and leg elements after assembly. A lower surface 50 thereof rests upon the leveling elements 14. The upper surface 51 is parallel to the lower surface 50, and communicates with peripheral side surfaces 52 and 53, and end surfaces 54 and 55.

The leveling elements include a threaded cylindrical member 56 bounded by an outer surface 57, a lower surface 58 and an upper surface 59. A centrally disposed threaded bore 60 engages the threaded shank 61 of a supporting member, rotation of the shank 61 within the bore 60 serving to position the head 63 such that the upper surface 64 thereof lies in coplanar relation with respect to that portion of the lower surface 50 of the table top element 13 which it contacts. It will be understood that this provision for adjustment permits the use of table top elements which are not entirely planar, do to warpage or other distortion, while providing for adequate support at a plurality points thereof.

In the first alternate form of the first embodiment, illustrated in FIGS. 1 and 4, the angularly disposed extensions 67 are placed outwardly of the side and end members 68 and 69, respectively, rather than inside of the members as is the case in the principal form of the first embodiment shown in FIG. 3, thus providing a different decorative effect.

Figure 2:
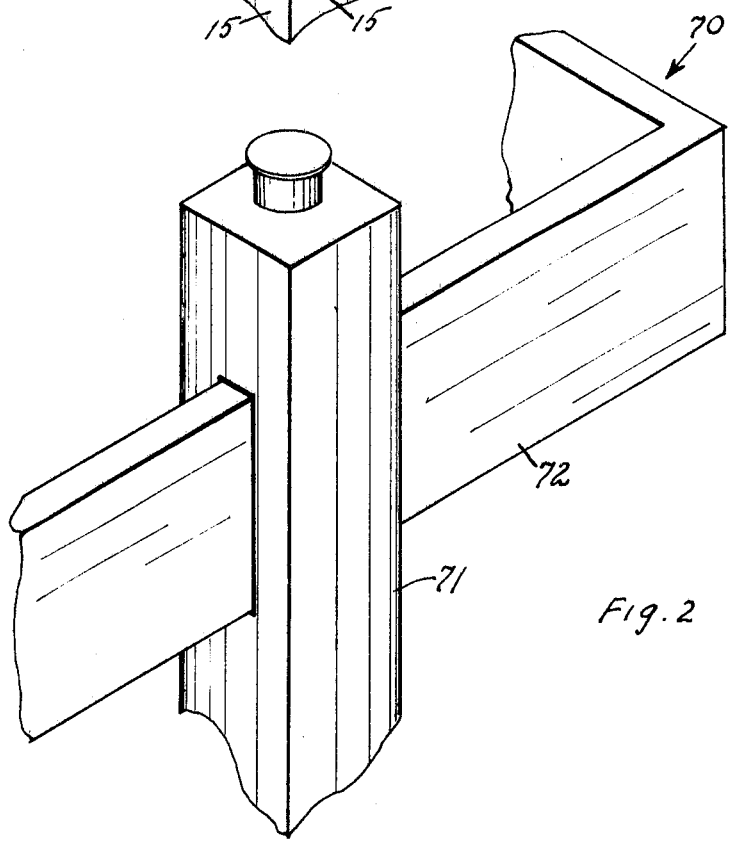
FIG. 2 is a second fragmentary view in perspective showing an alternate form of the embodiment.

In the second alternate form of the first embodiment, illustrated in FIGS. 2 and 5 in the drawing, and generally indicated by reference character 70, the leg elements 71 are attached directly to side members 72 and 73, with the elimination of angularly disposed extensions. This construction requires the provision of oppositely disposed axially aligned slots (not shown) corresponding to the slot 16, and the simultaneous clamping of both parts of split side members. Alternatively, the leg elements can be installed on the side members prior to the welding of the end members 75 and 76 thereto.

In the third alternate form of the first embodiment, indicated by reference character 78, and illustrated in FIG. 6 in the drawing, extensions 79, 80 and 81 comprise the entire frame element, and are interconnected at a center joint 82, the leg elements 83 being positioned on the free ends of the extensions.

Turning to the second embodiment of the invention, generally indicated by reference character 84, and illustrated in FIG. 11 in the drawings, parts corresponding to those of the first embodiment shown in FIG. 11 in the drawing, have been designated by similar reference characters with the additional prefix "1." In this embodiment, the upper and lower clamping members 85 and 86, respectively, each include first and second rigid washer portions 87 and 88, which enclose a resilient washer member 89. With this construction, it is not necessary to force fit either the upper or lower clamping member, and tightening of the threaded means 125 causes expansion of the washer member 89 to forceably engage the inner surfaces of the bore 126. This construction permits the presence of somewhat wider tolerances during manufacturing processes than is the case in the first embodiment, but none the less provides as rigid an interconnection, for practical purposes, once the device is assembled.

We wish it to be understood that we do not consider the invention limited to the precise details of structure shown and set forth herein, for obvious modifications will occur to those skilled in the art to which the invention pertains.

We claim:

1. A joint construction for interconnecting a hollow leg defining a bore with an elongated frame member disposed at an angle therewith, said construction comprising: said leg having at least one longitudinal wall having a side opening therein corresponding in size and configuration substantially to the cross section of and receiving an end of said frame member therein, first and second clamping members disposed within said bore on opposite sides of said opening, said clamping members having aligned bores therein; and threaded means for tightening and drawing said clamping members together upon said frame member, at least one of said clamping members being secured within said bore so as to be immobilized with respect thereto, whereby upon tightening said threaded means said frame member is immobilized with respect to said leg.

2. Structure in accordance with claim 1, further characterized in that one of said clamping members is force fitted with respect to the surface of said bore.

3. Structure in accordance with claim 1, further characterized in that at least one of said clamping members is resiliently expandable upon the tightening of said threaded means.

4. Structure in accordance with claim 1, further characterized in that both of said clamping members are resiliently expandable upon tightening of said threaded means.

5. Structure in accordance with claim 1, further characterized in that said leg element includes an upper end wall having an opening therein, threaded washer means overlying and supported by said upper wall, and threaded table tops supporting means including a head portion and a threaded shank portion threadedly engaged with said washer for adjusting the effective height thereof.

References Cited

UNITED STATES PATENTS 2,496,032  11/1950  Austin.
2,904,379  9/1959  Nelson.

FOREIGN PATENTS 108,812  2/1968  Denmark.

DAVID J. WILLAMOWSKY, Primary Examiner

A. V. KUNDRAT, Assistant Examiner

U.S. Cl. X.R.

248—188.8; 108—158